United States Patent [19]

Teach et al.

[11] 3,813,171

[45] May 28, 1974

[54] LASER BEAM SURVEY METHOD AND APPARATUS

[75] Inventors: Ted L. Teach, Springfield, Ohio; James D. Ramsay, Los Altos, Calif.

[73] Assignee: Laserplane Corporation, Dayton, Ohio

[22] Filed: Jan. 11, 1973

[21] Appl. No.: 322,864

[52] U.S. Cl................. 356/152, 172/4.5, 350/7, 356/172
[51] Int. Cl........................................... G01b 11/26
[58] Field of Search.......... 172/4.5; 350/7; 356/152, 356/172, 158

[56] References Cited
UNITED STATES PATENTS

| | | | |
|---|---|---|---|
| 3,494,426 | 2/1970 | Studebaker | 172/4.5 |
| 3,573,849 | 4/1971 | Herriot et al. | 350/7 |
| 3,641,351 | 2/1972 | Hintringer et al. | 172/4.5 |

*Primary Examiner*—Malcolm F. Hubler
*Assistant Examiner*—S. C. Buczinski
*Attorney, Agent, or Firm*—W. A. Schaich

[57] ABSTRACT

Laser beam survey method and apparatus utilizing a single laser beam source to establish both horizontal and vertical surveying reference planes. Such method and apparatus can be utilized, for example, to simultaneously automatically control tool height adjustment and steering adjustment mechanisms in a mobile ditch or trench digging machine.

8 Claims, 2 Drawing Figures

PATENTED MAY 28 1974 3,813,171
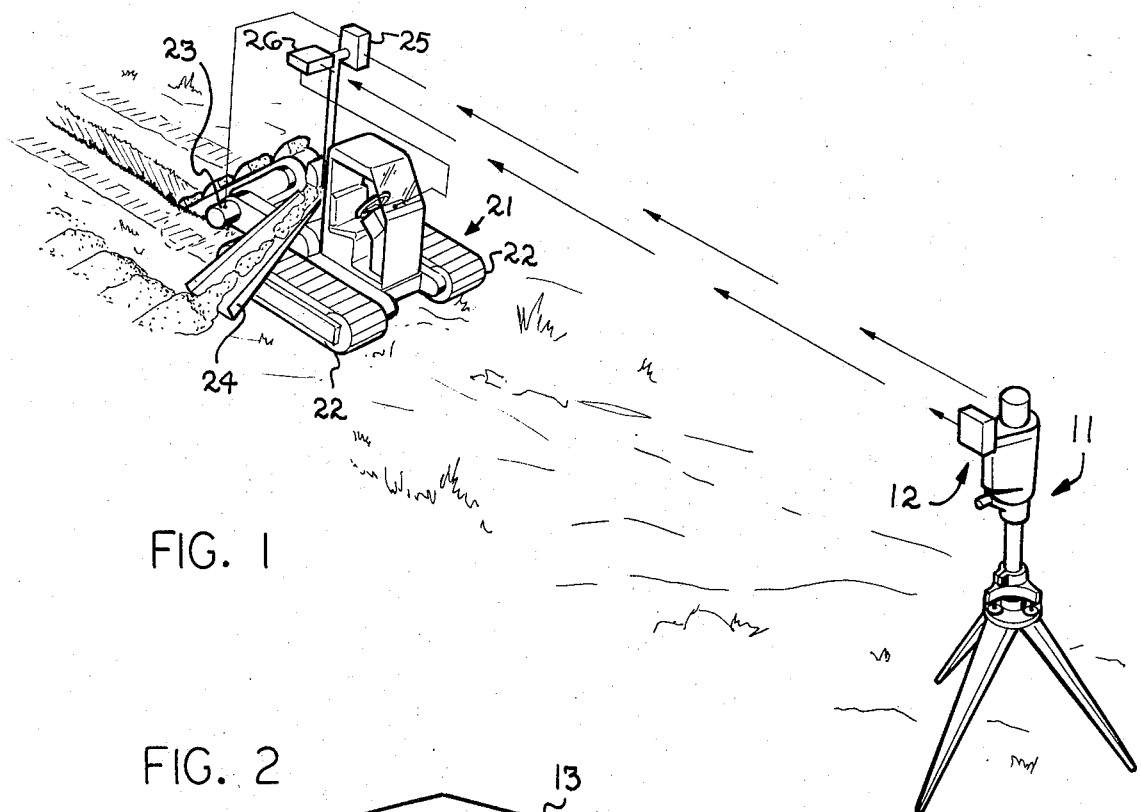
FIG. 1
FIG. 2
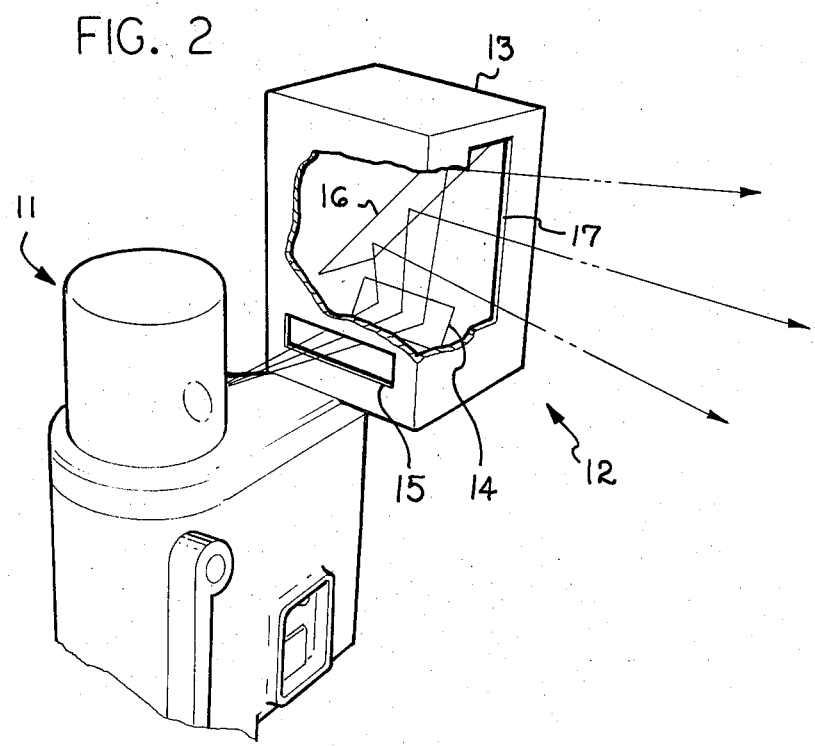

3,813,171

LASER BEAM SURVEY METHOD AND APPARATUS

GENERAL BACKGROUND OF THE INVENTION

In U.S. Pat. No. 3,588,249 to Robert H. Studebaker there is described apparatus for establishing a surveying reference plane, such apparatus comprising a laser beam generating device and a rotating or oscillating mirror or pentaprism system for intercepting the laser beam and for repeatedly reflecting it along a multitude of lines in a common plane. Such a device can be used to advantage, for example, to substantially continuously and closely monitor or control the vertical height of the earth working blade of a mobile earth grading machine in relation to a predetermined horizontal reference plane.

In many mobile earth-working machines, however, it is desirable to substantially continuously control both the vertical height of the earth-working tool and the direction of movement of the machine in relation, respectively, to predetermined horizontal and vertical reference planes. This, of course, can be done within the teachings of the aforesaid Studebaker Patent by utilizing a pair of devices of the type described therein oriented at right angles to one another. Such an arrangement would, however, be rather complicated and expensive.

In accordance with the present invention, however, it has now been found, that a pair of surveying reference planes extending at different angles, for example, horizontal and vertical planes, can be repeatedly and rapidly established with the aid of but a single laser beam survey apparatus. This can be accomplished by providing an additional pair of stationary mirrors, for receiving the laser beam reflected by the rotating or oscillating mirror or pentaprism component of such apparatus when the beam is in portion of the primary planar path through which it is repeatedly projected by such apparatus, and by reflecting the laser beam when it is in this portion of the path into a multitude of paths lying in a common plane at right angles to the primary planar path. Thus, the laser beam is successively projected along both planar paths, and when the rotational speed of rotation or oscillation of the turning mirror or pentaprism is sufficiently rapid, the periodic laser beam signals will be projected along the intersecting planar paths often enough to provide for virtually continuous control of two variables in the operation of a mobile earth working machine.

Accordingly, it is an object of the present invention to provide improved laser beam survey method and apparatus. More particularly, it is an object of the present invention to provide laser beam survey method and apparatus for rapidly and repeatedly establishing a pair of surveying reference planes extending at an angle to one another from a single laser beam generating device. More particularly, it is an object of the present invention to provide laser beam survey method and apparatus for rapidly and repeatedly establishing horizontal and vertical surveying reference planes. It is also an object of the present invention to provide a mobile earth-working machine in which the direction of movement of the machine, in reference to a vertical reference plane, and the height of the earth-working tool, in relation to a horizontal reference plane, are virtually continuously controlled from a single laser beam source.

For a further understanding of the present invention and the objects thereof, attention is directed to the following portion of the specification, to the drawing and to the appended claims.

DESCRIPTION OF THE DRAWING

FIG. 1 is a schematic view, in perspective, of laser beam survey apparatus in accordance with the present invention operating in conjunction with a mobile ditch digging machine; and FIG. 2 is an enlarged fragmentary view of a portion of the laser beam survey apparatus of FIG. 1.

DETAILED DESCRIPTION OF THE DRAWING

In FIG. 1 there is shown a laser beam survey device, shown generally at 11, for generating a vertically upwardly directed laser beam and for repeatedly reflecting such laser beam along an infinite number of paths lying in a common horizontal path by means of a rotating or oscillating mirror or pentaprism. Except as is hereinafter described more fully, laser beam survey device 11 is preferably constructed in accordance with the teachings of U.S. Pat. No. 3,588,249 to Robert H. Studebaker, and need not be described in any more detail herein.

There are some applicantions of equipment control by a laser beam that can desirably concurrently employ two laser beam reference planes, for example, a horizontal pane and a vertical plane. In accordance with the method of this invention, a single laser beam source is utilized to generate a single laser beam and this beam is then translated into a reference plane by a rotating reflecting device, such as a penta-prism. Thus a first laser beam reference plane is established which may be horizontal. During a portion of the arcuate path of the reflected rotating laser beam, it is caused to intercept a stationary reflecting device, which reflects the moving beam into a plane disposed at an angle with respect to the first plane; for example, a vertical plane. Since any laser beam sensing means are normally actuated only for a brief period during each rotation of the laser beam, it is apparent that a first control actuation by detection of the horizontal plane component of the rotating laser beam may be effected concurrently with a second control actuation by detection of the vertical plane component of the rotating laser beam.

As is shown in more detail in FIG. 2, a reflective device, indicated generally at 12, is attached to the laser beam survey device 11. Reflective device 12 comprises a housing 13 which contains a first stationary beam reflecting mirror 14 which is disposed at a 45° upwardly facing angle and which lies along a portion of the horizontal planar path swept by the laser beam reflected by the rotating or oscillating pentaprism of device 11. An opening or window 15 is provided in housing 13 to permit the laser beams from device 11 to strike mirror 14. Located above stationary mirror 14 within housing 13 is a second stationary beam reflecting mirror 16. Mirror 16 is positioned at an angle of 45° to the horizontal and is positioned to intercept the vertical laser beam projections from mirror 14. Mirror 16, in turn, re-reflects the laser beam projections along outwardly projecting paths in a common vertical plane through an opening or window 17 in housing 13. Because of the planar nature of the reflective surfaces of mirrors 14 and 16, the paths of the laser beam reflected therefrom, at successive time intervals during the sweep of the mirror or pentaprism of device 11, will be divergent outwardly from one another, as is indicated by the arrows in FIG. 2 which indicate three of such paths. Nonetheless, all reflection paths from each such mirror will be co-planar, and the laser beam reflections from mirror 16 will be outwardly directed and will be of sufficient intensity to establish an effective vertical surveying reference path at a distance of up to 2,000 feet from the laser beam survey device 11.

A laser beam survey apparatus comprising a laser beam survey device 11 for projecting a laser beam in a horizontal plane and a reflective device 12 for reflecting the laser beam in a vertical plane may be utilized to advantage in controlling the operation of a mobile ditch or trench digging machine, shown generally at 21 in FIG. 1. Machine 21 is of an otherwise conventional construction, comprising spaced apart endless metal drive treads 22, an earth engaging tool 23 comprising a plurality of scoops mounted on an endless, inclined conveyor at the rear of machine 21, and intermediate treads 22, an earth discharge chute 24 for discharging, at the side of machine 21, earth brought up by tool 23 and appropriate drive apparatus of a conventional nature for propelling machine 21 along the terrain. Adjustment means, not shown, of a conventional nature is also provided to control the angle of inclination of tool 23 to thereby control, in relation to the elevation of the terrain engaged by the lower runs of the machine treads 22, the depth of the ditch or trench which is dug. However, as the machine may be used to dig a ditch or trench in ungraded or inaccurately graded terrain, where the desired depth must be more accurately controlled than the ground elevation traversed by the machine, there is provided a photosensitive laser beam receiving device 25 mounted atop machine 21 for receiving the laser beam projected by the laser beam survey apparatus along the horizontal plane. As is explained in U.S. Pat. No. 3,494,426 to Robert H. Studebaker, receiving device 25 may be considered to comprise a pair of vertically spaced apart photocells which are sensitive to the laser beam from the laser beam survey apparatus, and the output signals from these photocells may be used in the manner described in the aforesaid Studebaker patent to raise or lower the elevation of tool means 23 to control the depth of the trench or ditch being dug by machine 21 in relation to the elevation of the horizontal laser plane generated by the laser beam survey apparatus. In accordance with this invention, there is also provided a second photosensitive laser beam receiving device 26, comprising horizontally spaced apart photocells (not shown) for receiving the reflected laser beam projected along a vertical plane by the reflective device 12 component of the laser beam survey apparatus. The output signals from the photocells of receiving device 26 are used to automatically control the steering adjustment of apparatus of machine 21, through a conventional servomechanism and hydraulic system of course, to accurately guide the forward movement of machine 21. Thus, the control of the longitudinal orientation or position of the trench or ditch being dug by machine 21 can also be accurately and automatically controlled.

The best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

We claim:

1. Laser beam survey apparatus for successively establishing first and second surveying reference planes, which planes are disposed at right angles to one another, said apparatus comprising, in combination: a laser beam generating device; arcuately movable laser beam reflective means to repeatedly reflect the laser beam from said generating device along a multitude of paths lying in a first plane; and first stationary laser beam reflective means intercepting a portion of the first plane and disposed at an angle with respect thereto to deflect the laser beam in the paths intercepted by said first laser beam reflective means into a multitude of diverging paths lying in a second plane angularly disposed relative to the first plane.

2. Apparatus according to claim 1 wherein said first stationary laser beam reflective means is disposed at an angle of 45° with respect to said first plane, whereby said second plane will be disposed at a right angle to said first plane.

3. Apparatus according to claim 2 wherein said first plane is generally horizontally oriented and wherein said second plane is generally vertically oriented and generally vertically extending, and further comprising second stationary reflective means disposed at an angle of 45° with respect to the horizontal to repeatedly reflect the laser beam in the paths of the second plane along a multitude of diverging paths lying in a third plane, said third plane being generally vertically oriented and extending horizontally away from said laser beam survey apparatus.

4. Apparatus according to claim 3 comprising a common housing for containing said first and second stationary laser beam reflective means, said housing being transmissive to said laser beam paths along said first, second and third planes.

5. An earth working machine comprising an earth working tool which is adjustable in height relative to a fixed horizontal plane, and a steering mechanism for steering the movement of the machine over the terrain relative to a fixed vertical plane; first control means comprising first photosensitive means sensitive to light beams lying in said fixed horizontal plane for controlling the height of the earth working tool; second control means comprising second photosensitive means sensitive to light beams lying in said fixed vertical plane for controlling the steering mechanism; and laser beam survey apparatus disposed away from said machine and comprising a laser beam generating device for generating a single laser beam, and reflective means for alternately and repeatedly reflecting said single laser beam toward the first and second photosensitive means first in a multitude of first paths lying along said fixed horizontal plane and then in a multitude of second paths lying along said fixed vertical plane.

6. An earth working machine according to claim 5 wherein said reflective means comprises arcuately movable reflective means to reflect light from said laser beam generating device toward the first photosensitive means along a multitude of paths lying along said fixed horizontal plane and stationary reflective means for reflecting light beams from a multitude of paths lying along said fixed horizontal plane toward the second photosensitive means along a said multitude of second paths.

7. An earth working machine according to claim 6 wherein said stationary reflective means comprises a first reflector lying along said fixed horizontal plane and having a reflecting surface inclined at an angle of 45° with respect thereto and a second reflector facing toward the reflecting surface of said first reflector and in vertical alignment therewith, said second reflector being inclined toward said earth working machine at an angle of 45° with respect to said fixed horizontal plane.

8. Method of controlling earth working machinery from a remote position by repeatedly and alternately energizing a horizontal array of photocells and an adjacent vertical array of photocells carried by the earth working machine, comprising the steps of:
(1) producing a single laser beam rotating in a horizontal plane about an axis remotely located relative to the earth working machine, whereby said single laser beam repeatedly sweeps over at least one of the said vertical array of photocells; and
(2) intercepting said horizontally moving laser beam only during a minor portion of its arcuate movement to sweep said single laser beam through a vertical plane so as to traverse at least one of said horizontally spaced array of photocells on said earth working equipment.

* * * * *